United States Patent [19]

Bormioli

[11] Patent Number: 5,752,724

[45] Date of Patent: May 19, 1998

[54] COUPLING DEVICE FOR DUCTS

[76] Inventor: Giorgio Bormioli, Via Galileo Galilei, 21-35100 Padova, Italy

[21] Appl. No.: 569,727

[22] Filed: Dec. 8, 1995

[30] Foreign Application Priority Data

Nov. 13, 1995 [EP] European Pat. Off. ............ 95830477

[51] Int. Cl.$^6$ ........................................... F16L 23/00
[52] U.S. Cl. .......................... 285/18; 285/364; 285/320
[58] Field of Search ............................ 285/18, 308, 309, 285/310, 320, 363, 364, 920, 312

[56] References Cited

U.S. PATENT DOCUMENTS

| | | | |
|---|---|---|---|
| 4,113,283 | 9/1978 | Curtis et al. | 285/320 |
| 4,138,149 | 2/1979 | Bormioli | 285/320 |
| 4,202,567 | 5/1980 | Paddington | 285/320 |
| 4,309,049 | 1/1982 | Chevallier | 285/18 |
| 4,722,557 | 2/1988 | Bormioli | 285/18 |
| 4,730,850 | 3/1988 | Takahashi | 285/18 |
| 4,923,219 | 5/1990 | Bormioli | 285/18 |
| 5,518,278 | 5/1996 | Sampson | 285/312 |
| 5,586,789 | 12/1996 | Bently | 285/312 |

FOREIGN PATENT DOCUMENTS 1665159  7/1991  U.S.S.R. ........................ 285/310

*Primary Examiner*—Eric K. Nicholson
*Attorney, Agent, or Firm*—Shlesinger, Fitzsimmons & Shlesinger

[57] ABSTRACT

A coupling device for ducts comprises locking elements movably mounted in a circumferential succession on an end flange of a first duct having a longitudinal axis, moving member for moving said locking elements from a first position to a second position where said locking elements are engaged with an end flange of a second duct to keep it against the end flange of the first duct, elastically stressed floating ring seal members housed in a sliding and oscillating manner in a respective seat provided in the end flange of the first duct. Each locking element comprises a jaw rotatable around a rotation axis which is parallel to the longitudinal axis of the first duct. The moving member comprises a ring rotatably mounted on said first duct, said ring having a plurality of toothed sectors each engaged with a respective pinion fixedly mounted on a respective locking element.

6 Claims, 4 Drawing Sheets

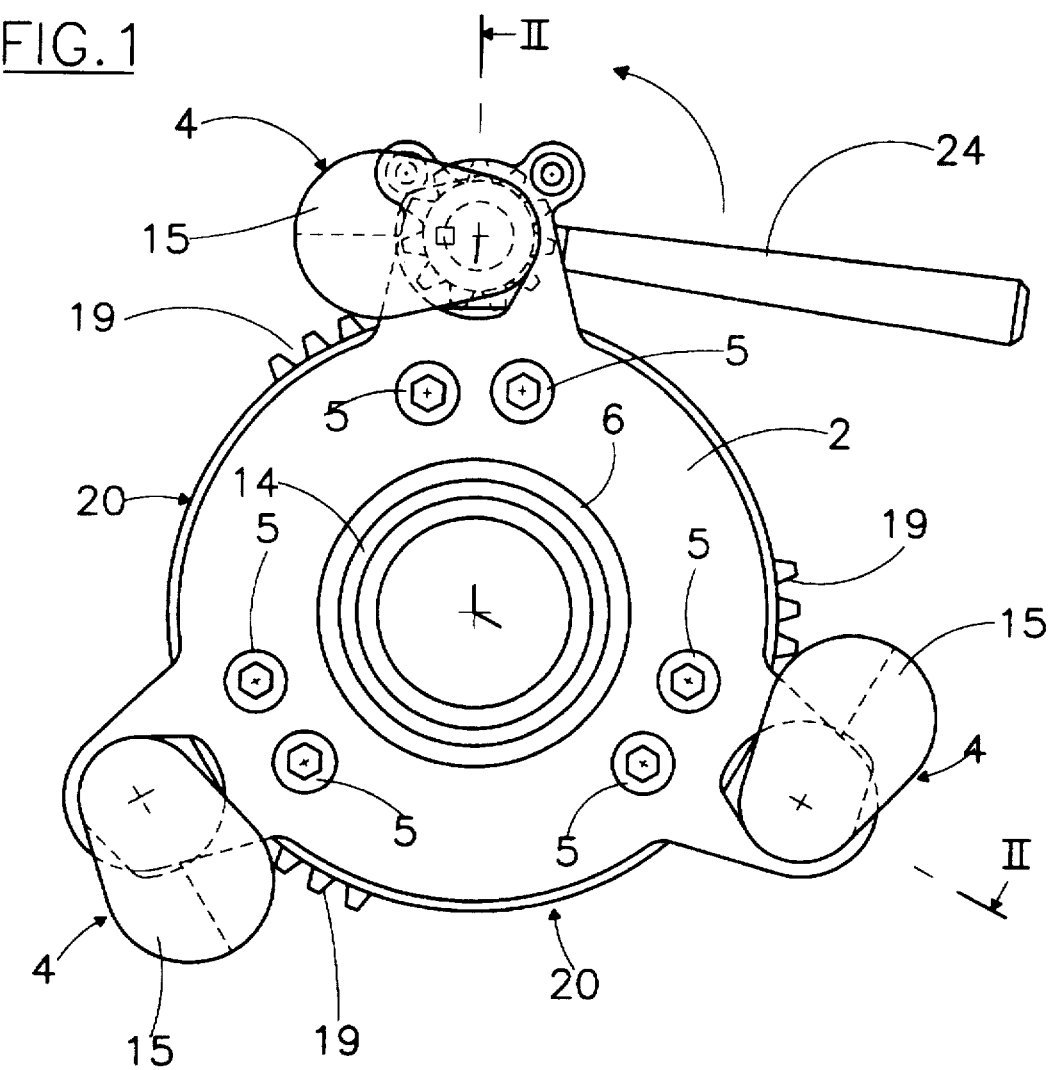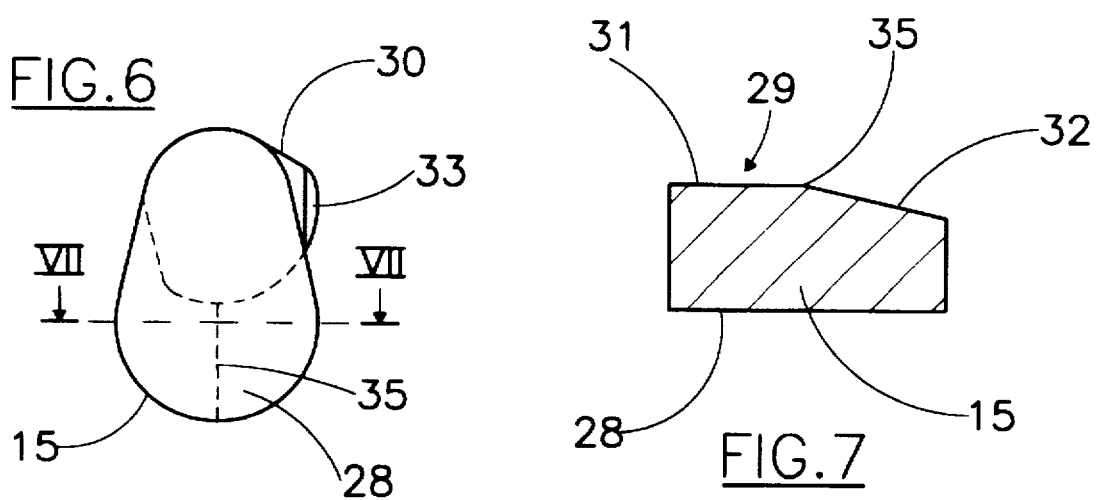

COUPLING DEVICE FOR DUCTS

The present invention relates to a coupling device for ducts, in particular for connection of ducts on a tanker/barge, or other system for the transport of bulk liquids, with a loading/offloading terminal or installation.

Coupling devices for ducts are known in the art. For example, in the Italian patent No. 844,387 granted to the same applicant a coupling device is described comprising locking elements hinged on the flange of a first duct and arranged at the same distance around the circumference of the duct. The locking elements rotate in radial planes having in common the axis of the duct. Each of said locking elements is connected to one end of a rod having elastically variable length, while the other end of the rod is hinged to a thrust ring common to all the rods.

The thrust ring can be rotated alternately between two positions around the axis of the first duct. By rotating the ring in one direction, the rods are shortened starting from an oblique and elongated position until they lie parallel to the duct, and are elongated again by elastic thrust, forcing the locking elements to close to engage and hold under pressure the flange of a second duct, which is placed adjacent to the flange of the first duct. Rotation of the ring in the opposite direction causes elongation of the rods, which arrange themselves obliquely to the axis of the duct, opening the locking elements and freeing the flange previously restrained. Elastic lengthening and shortening of the rods are obtained by placing an elastic connecting joint between two mutually aligned portions of rod.

This coupling device guarantees good coupling security and fast engagement and disengagement of the two ducts.

Another type of coupling devices for ducts is described in the European patent application No. 276,033, filed in the name of the same applicant. This coupling device is substantially similar to that previously described, with the difference that the sealing is guaranteed by floating rings accommodated in respective recesses provided in the flange of the first duct and biased against the flange of the second duct by elastic elements.

With respect to the first kind of coupling device, in this second kind of coupling device the use of elastically biased floating rings makes it unessential to use a driving motor; however, both kinds of coupling devices occupies a significant space in the axial direction of the duct.

In view of the state of the art described, it is an object of the present invention to provide a coupling device which does not require a driving motor, occupies a little space in the axial direction of the first duct, is of light constitution and has a reduced cost, while assuring good sealing characteristics.

According to the present invention, such object is achieved thanks to a coupling device for ducts comprising locking elements movably mounted in a circumferential succession on an end flange of a first duct having a longitudinal axis, moving means for moving said locking elements from a first position to a second position where said locking elements are engaged with an end flange of a second duct to keep it against the end flange of the first duct, elastically stressed floating ring seal means housed in a sliding and oscillating manner in a respective seat provided in the end flange of the first duct, characterized in that each locking element comprises a jaw rotatable around a rotation axis which is parallel to the longitudinal axis of the first duct, and in that said moving means comprises a ring rotatably mounted on said first duct, said ring having a plurality of toothed sectors each engaged with a respective pinion fixedly mounted on a respective locking element.

A coupling device according to the present invention has the advantage of requiring a very small force to move the locking elements, whereby the latter can be operated by hands. Also, the space occupied in the axial direction is smaller than in conventional coupling device wherein the locking elements rotate around axes orthogonal to the longitudinal axis of the duct. The sealing characteristics of the coupling device of the invention are assured by the presence of the elastically stressed floating ring seal means, which allows to compensate possible differences in the thickness of the flange of the second duct. The coupling device according to the present invention is of lighter construction conventional coupling devices.

These and other features and advantages of the present invention will be made apparent from the following detailed description of a particular embodiment, described as a non limiting example in the annexed drawings, wherein:

FIG. 1 is a front view of a coupling device according to the present invention, in a rest condition;

FIG. 6 is a detailed front view of the locking means shown in FIG. 5;

FIG. 7 is a cross-sectional view of said locking means along line VII—VII of FIG. 6;

Figure 2:
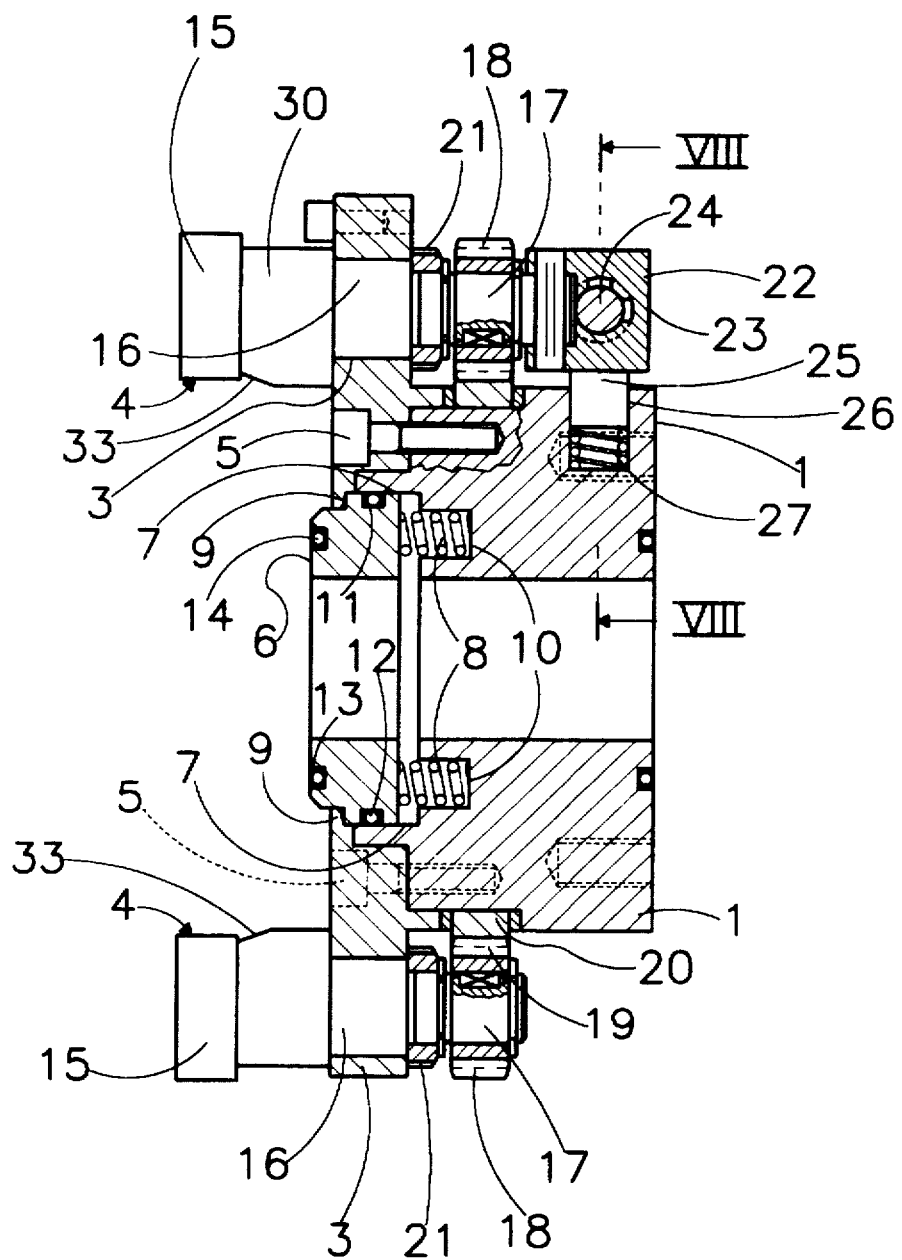
FIG. 2 is a cross-sectional view of the coupling device shown in FIG. 1, along line II—II.

With reference to FIGS. 1 to 4, a coupling device is shown comprising a first duct 1 having an end flange 2 fixedly mounted by means of screws 5 to the body of the duct 1. Three passing-through holes 3 with axis parallel to the axis of the first duct 1 are provided in the flange 2 at equal distances around the circumference of the flange. In each hole 3 a locking element 4 is rotatably inserted, the rotation axis of each locking element 4 being parallel to the axis of the first duct 1. A seal ring 6 is arranged inside a cylindrical seat 7 provided in the front end of the body of the first duct 1; springs 8, inserted in respective recesses 10 in the body of the first duct 1, axially bias the seal ring 6 toward the outside of the first duct 1. A cylindrical bead 9 of the flange 2 prevents the seal ring 6 from escaping its cylindrical seat 7. The external annular surface of the seal ring 6 has a form complementary with the internal annular surface of the cylindrical seat 7, whereby the seal ring 6 can oscillate around the axis of the first duct 1. A first cirumferential grove 11 is provided in the external annular surface of the seal ring 6 to accommodate a first O-ring 12; a second circular grove 13 is formed in the front surface of the seal ring 6 to accommodate a second O-ring 14.

Figures 3, 5:
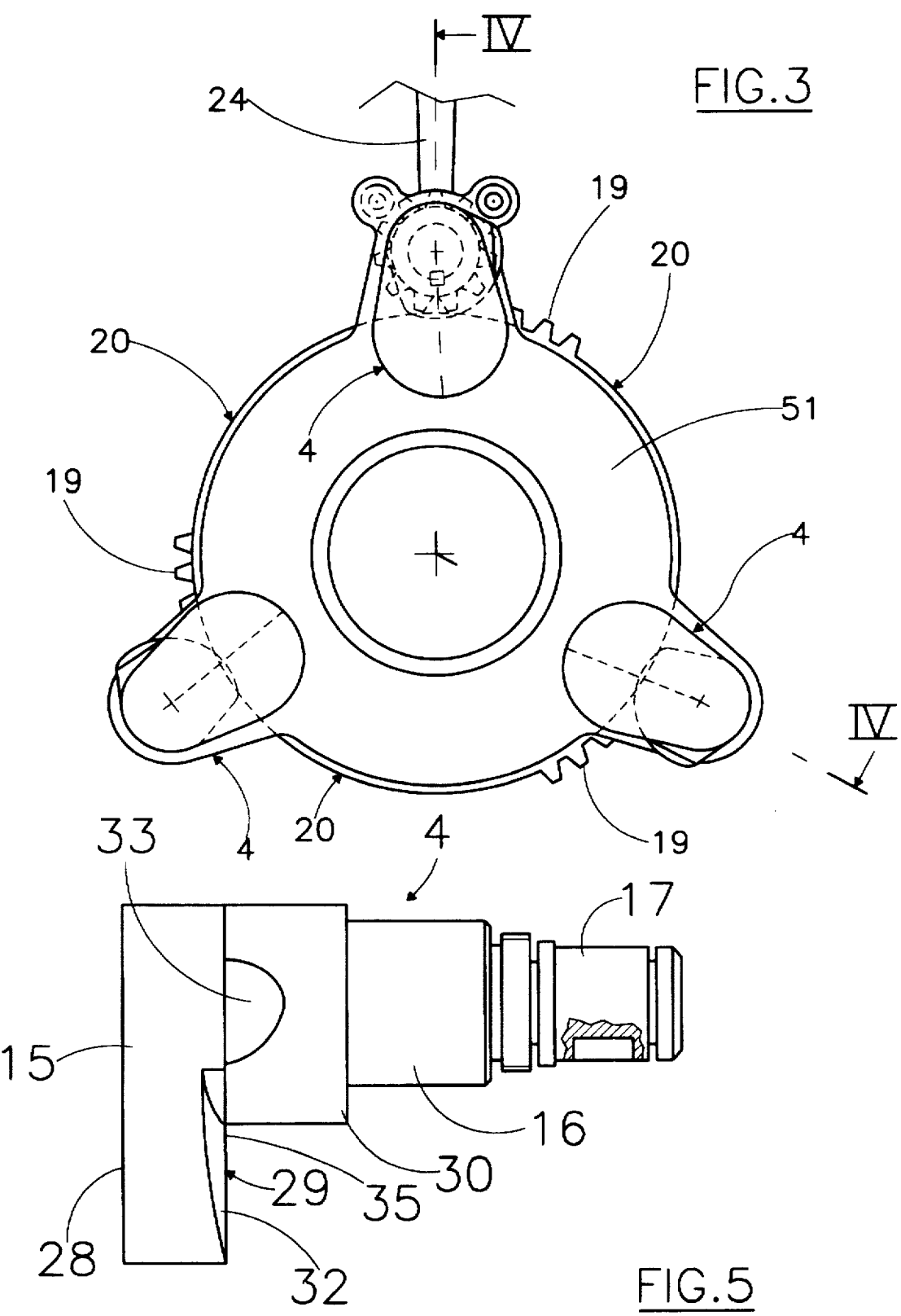
FIG. 3 is a front view of the coupling device of FIG. 1, in a working condition.
FIG. 5 is a detailed side view of a locking means of the coupling device of the present invention.
Figure 4:
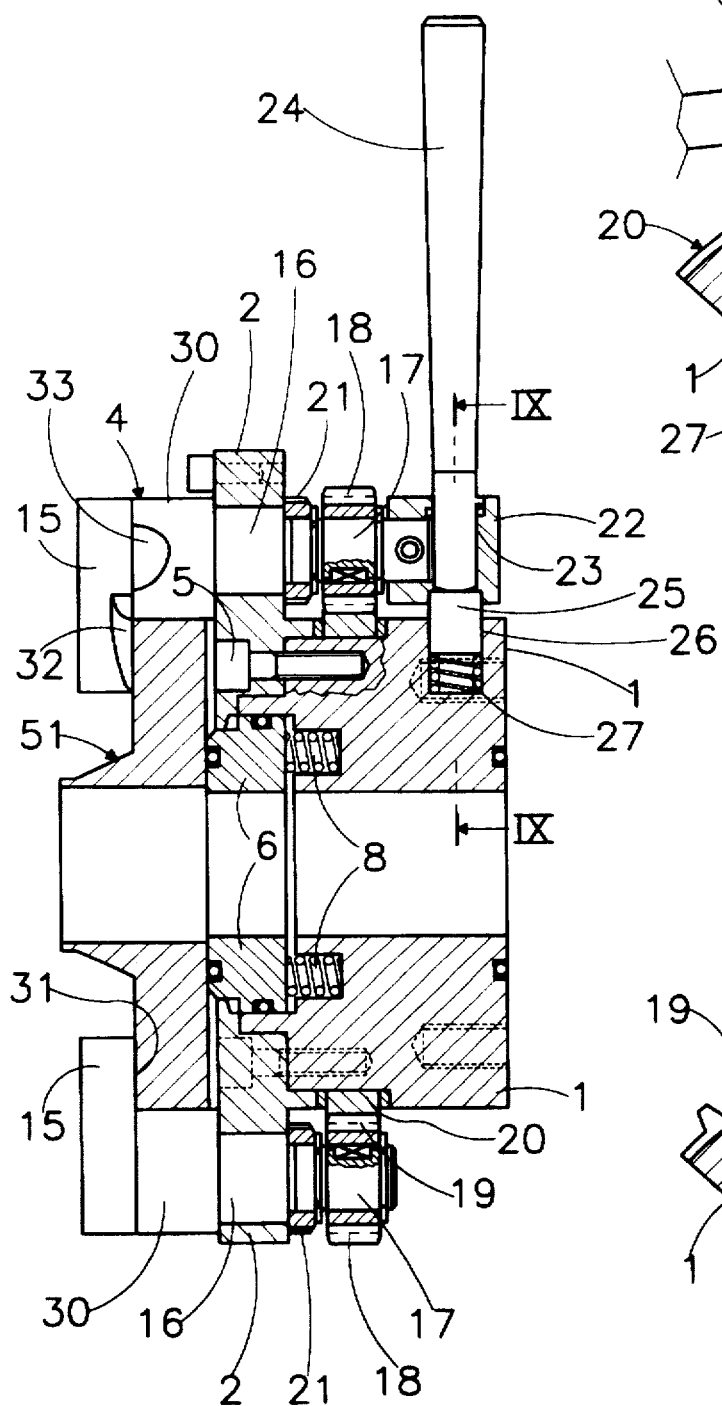
FIG. 4 is a cross-sectional view of the coupling device shown in FIG. 3 along line IV—IV.

As shown in detail in FIGS. 5–7, each Locking element 4 comprises a centering element 30 and a jaw 15 integral with a substantially cylindrical body 16 of the same diameter of the holes 3; the jaw 15 extends orthogonally to the axis of the cylindrical body 16. Integral with the body 16 of the locking element 4 is a hub 17, on which a pinion 18 is fixedly mounted. The pinion 18 engages a respective toothed sector 19 of a ring 20 rotatably mounted on the body of the first duct 1. A threaded locking ring 21 prevents the locking element from axially sliding inside the respective hole 3.

The jaw 15 has an outer side 28 with a substantially flat surface perpendicular to the rotation axis of the jaw, and an inner side 29 with a surface divided by a longitudinal dividing line 35 into a first half 31 lying in a vertical plane orthogonal to the axis of the duct 1 (i.e. the first half 31 of the inner surface lies in a plane parallel to the that of the outer surface 28), and a second half 32 having an inclined helicoidal development, so that the thickness of the jaw 15 decreases from the central longitudinal axis of the jaw toward its lateral edge. Also, the centering element 30 has a bevel 33 which, as will be explained in greater detail in the following, facilitates the alignment of a flange of a second duct with the flange 2 of the first duct 1.

Figure 8:
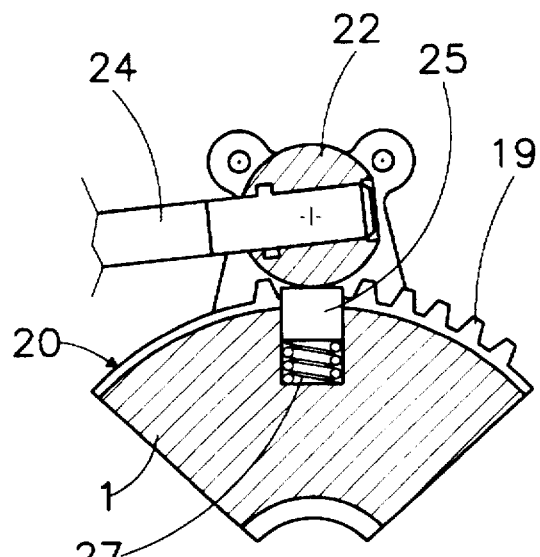
FIGS. 8 and 9 are cross-sectional views along lines VIII—VIII of FIG. 2 and IX—IX of FIG. 4.
Figure 9:
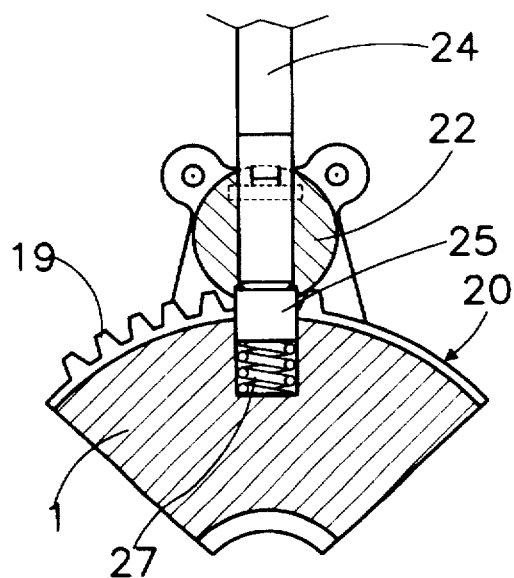

One of the three locking elements 4 has a cylindrical body 22 fixedly mounted on the hub 17. The cylindrical body 22 has formed there in a passing-through hole 23, inside which one end of a driving lever 24 is accommodated and blocked by means of a bayonet coupling. The driving lever 24 extends in a plane parallel to that of the flange 2 of the first duct 1. A pin 25 is slidingly housed in a respective seat 26 formed in the body of the first duct 1, and is elastically biased by a spring 27 in a radial direction toward the cylindrical body 22. When the driving lever 24 is rotated in a vertical position, shown in FIGS. 4 and 8 (corresponding to the locking position of the locking elements 4) the hole 23 in the cylindrical body 22 is aligned with the pin 25, which engages with the hole 23 under the thrust of the spring 27; in this way, the rotation of the driving lever 24 in the clockwise direction to open the jaws 15 is prevented. To allow the driving lever 24 to rotate the lever 24 must be pushed downwards to push the pin 25 back into its seat 26, disengaging the pin 25 from the hole 23; the lever 24 can then be rotated in the clockwise direction to open the jaws 15 (FIG. 9).

The coupling device previously described operates in the following way.

FIGS. 1 and 2 show the condition of the coupling device at rest, before the beginning of a coupling operation between the first duct 1 with a second duct. The driving lever 24 is rotated in its rightmost angular position and the locking elements 4 are correspondingly rotated in such a way as the jaws 15 do not interfere with a flange of the second duct; the bevels 33 of the centering elements 30 point toward the axis of the first duct. The seal ring 6 protrudes from the front surface of the flange 2 of the first duct 1 under the biasing action of the springs 8.

A second duct 51 is brought close to the first duct 1; the bevels 33 of the centering elements 30 facilitate the alignment of the second duct with the first duct.

While the second duct is maintained close to the first duct, the driving lever 24 is rotated, either by hands or by means of a motor, in the direction shown in FIG. 1. The rotation of the driving lever 24 causes the locking element 4 to which the driving lever 24 is connected to rotate around its axis (parallel to the axis of the ducts to be coupled) inside the respective through hole 3; this rotation is transmitted by the pinion 18 to the ring 20, which rotates around the axis of the duct 1; the rotation of the ring 20 is transmitted, by means of its toothed sectors 19, to the pinions 18 of the remaining two locking elements 4. All the locking elements rotate therefore simultaneously from the releasing position shown in FIGS. 1 and 2 to the locking position shown in FIGS. 3 and 4.

During the rotation of the locking elements 4, the inner side 29 of the jaws 15 engage with the end flange of the second duct 51; in the initial phases of the rotation of the locking elements 4 it is the helicodally inclined surface 32 which engages first with the end flange of the second duct 51; this allows to accommodate end flanges of the second duct 51 which may have dirreferent thickness. The second duct 51 is progressively pushed toward the flange 2 of the first duct 1, and the seal ring 6 is pushed back into its seat 7.

When the driving lever 24 has been completely rotated in its leftmost angular position, the flange of the second duct 51 is kept blocked against the flange 2 of the first duct by the flat half-surface 31 of the inner side of the jaws 15.

The seal ring 6, being constantly biased by the springs 8 toward the flange of the second duct 51, guarantees a secure sealing between the first duct and the second duct. The sealing between the first duct and the second duct is guaranteed even if the thickness of the end flange of the second duct is lower than the distance between the flat half-surface of the inner side of the jaws and the surface of the end flange of the first duct, because the seal ring 6 is constantly biased by the springs 8 toward the end flange of the second duct (in this case, the seal ring will not be completely pushed back into its seat 7). Second ducts having flanges of variable thickness can thus be securely coupled to the first duct. Moreover, thanks to the external annular surface of the seal ring 6 and the complementary internal surface of its seat 7, the seal ring 6 can oscillate inside the seat 7 to compensate possible variations of the thickness of the end flange of the second duct along its diameter.

I claim:

1. Coupling device for ducts comprising locking elements movably mounted in a circumferential succession on an end flange of a first duct having a longitudinal axis, moving means for moving said locking elements from a first position to a second position where said locking elements are engaged with an end flange of a second duct to keep it against the end flange of the first duct, an elastically stressed floating ring seal means housed in a sliding and oscillating manner in a respective seat provided in the end flange of the first duct, characterized in that each locking element comprises a jaw rotatable around a rotation axis which is parallel to the longitudinal axis of the first duct, said moving means comprises a ring rotatably mounted on said first duct, said ring having a plurality of toothed sectors each engaged with a respective pinion fixedly mounted on a respective locking element.

2. Coupling device according to claim 1, characterized in that said moving means further comprise at least a driving lever extending in a plane parallel to the plane of the flange of the first duct and coupled with a respective one of said locking elements to cause rotation thereof around its rotation axis.

3. Coupling device according to claim 1, characterized in that said elastically stressed floating ring seal means comprises a floating seal ring slidingly housed in a respective seat provided in the first duct, and springs housed in respective recesses formed in the first duct to bias the seal ring in an axial direction against the flange of the second duct.

4. Coupling device according to claim 3, characterized in that said floating seal ring has an external annular surface complementary with an internal annular surface of the respective seat to allow oscillations of the seal ring inside said respective seat for compensating variations of the thickness of the flange of the second duct along its diameter.

5. Coupling device according to claim 4, characterized in that said jaws have an outer side and an inner side, the inner side being laterally divided into first and second portions by a dividing line parallel to a longitudinal axis of the jaws and perpendicular to the rotation axis of the jaws, the first portion lying in a plane orthogonal to the rotation axis of the jaw so as to maintain, when in said second position, the end flange of the second duct in a plane parallel to and contacting with the plane of the end flange of the first duct, the second portion defining an inclined surface inclined toward a lateral edge of the jaw which during a locking movement of the jaws engages first with the end flange of the second duct, to make the coupling device capable of accommodating second ducts having end flanges with variable thickness.

6. Coupling device according to claim 1, characterized in that said locking elements further comprise centering elements integral with said jaws for facilitating the alignment of the flange of the second duct with the flange of the first duct.

* * * * *